United States Patent
Trombetta et al.

(10) Patent No.: US 6,992,132 B2
(45) Date of Patent: Jan. 31, 2006

(54) COMPOSITIONS OF CROSSLINKABLE POLYURETHANES

(75) Inventors: Tania Trombetta, Milan (IT); Fiorenza D'Aprile, Milan (IT); Stefano Turri, Milan (IT)

(73) Assignee: Solvay Solexis, S.p.A., Milan (IT)

(*) Notice: Subject to any disclaimer, the term of this patent is extended or adjusted under 35 U.S.C. 154(b) by 78 days.

(21) Appl. No.: 10/453,575

(22) Filed: Jun. 4, 2003

(65) Prior Publication Data

US 2003/0229176 A1    Dec. 11, 2003

(30) Foreign Application Priority Data

Jun. 6, 2002    (IT) .......................... MI2002A1228

(51) Int. Cl.
  C08J 3/00    (2006.01)
  C08K 3/20    (2006.01)
  C08L 75/00   (2006.01)
  B05D 3/02    (2006.01)
  B32B 27/00   (2006.01)

(52) U.S. Cl. ............... 524/591; 427/372.2; 427/385.5; 428/423.1; 524/839; 524/840

(58) Field of Classification Search ............. 428/423.1; 524/591, 839, 840; 427/372.2, 385.5
See application file for complete search history.

(56) References Cited

U.S. PATENT DOCUMENTS

| | | |
|---|---|---|
| 3,242,218 A | 3/1966 | Miller |
| 3,715,378 A | 2/1973 | Sianesi et al. |
| 3,810,874 A | 5/1974 | Mitsch et al. |
| 4,523,039 A | 6/1985 | Lagow et al. |
| 4,647,413 A | 3/1987 | Savu |
| 5,039,732 A * | 8/1991 | Arora .......................... 524/591 |
| 5,149,842 A | 9/1992 | Sianesi et al. |
| 5,258,110 A | 11/1993 | Sianesi et al. |
| 6,071,564 A | 6/2000 | Marchetti et al. |
| 6,077,592 A | 6/2000 | Azuma et al. |

FOREIGN PATENT DOCUMENTS

| | | |
|---|---|---|
| EP | 0 148 482 | 7/1985 |
| EP | 0 239 123 | 9/1987 |
| EP | 0 273 449 A | 7/1988 |
| EP | 0 340 740 | 11/1989 |
| EP | 0 533 159 A | 3/1993 |
| EP | 0 665 253 | 8/1995 |
| EP | 0 665 253 A | 8/1995 |
| EP | 0 689 908 | 1/1996 |
| EP | 1 162 220 | 12/2001 |
| EP | 1 162 220 A1 | 12/2001 |
| EP | 1 273 704 A | 1/2003 |
| GB | 1104482 | 2/1968 |
| WO | WO 90/03357 | 4/1990 |

OTHER PUBLICATIONS

European Search Report.

* cited by examiner

*Primary Examiner*—Patrick D. Niland
(74) *Attorney, Agent, or Firm*—Arent Fox PLLC

(57) ABSTRACT

Compositions comprising anionic ionomeric polyurethanes crosslinkable in a wide temperature range, said composition comprising the following components:

I) an aqueous dispersion of a linear crosslinkable ionomeric polyurethane, containing carboxylic groups and having a perfluoropolyether structure;

II) a crosslinking agent, the ratio between the equivalents of the functional groups of the crosslinking agent and of the carboxylic groups of component I) being at least 0.7 up to 1.5, preferably 0.9–1.2, said crosslinking agent being dispersible or soluble in the dispersion component I).

16 Claims, No Drawings

COMPOSITIONS OF CROSSLINKABLE POLYURETHANES

The present invention relates to compositions comprising aqueous dispersions of crosslinkable polyurethanes having (per)fluoropolyether structures, allowing to obtain crosslinked polymeric films, having high water-, solvents resistance propertries, low friction coefficient and antigraffiti properties.

Specifically the invention relates to ionomeric polyurethanes crosslinkable by addition of external crosslinking agents, active even at room temperature.

It is known the use of solutions in organic solvents of polyurethanes having a perfluoropolyether structure to obtain coatings on substrata of various materials. See for example EP 665,253, U.S. Pat. No. 6,077,592, U.S. Pat. No. 6,071,564. By crosslinking of the above polyurethanes, in said patents it is stated that coatings are obtained showing high water or solvents resistance properties, low friction coefficient and/or antigraffiti properties. Generally in said patents said properties are separately examined. The combination of properties obtained from said polyurethanes in solvents are those desired in practice, however said solutions show the drawback to use a solvent. Indeed the toxicity and the flammability of the organic solvents used in these compositions limit the use of said polyurethanes. Said solutions are not suitable for example to be used in closed environments.

To avoid the use of organic solvents, it is known to use aqueous dispersions of ionomeric polyurethanes. For example in EP 689,908 the use of urethane polymer dispersions having a perfluoropolyether structure, of ionomeric, cationic and anionic type, is described, for applications in particular on wood and cement. The Applicant has found that by using said polyurethanes some properties of the obtained coating, such for example the chemical resistance, are not good. EP 1,162,220 describes cationic polyurethane dispersions having a branched structure containing (per) fluoropolyethers. Said polyurethanes contain in the molecule thermoreactive groups which crosslink only at high temperatures. The drawback of said compositions is that said temperatures limit the applications.

The need was felt to have available aqueous compositions of ionomeric polyurethanes which applied on various supports had the following property combination:
- crosslinking in in a wide temperature range, starting from 10° C. up to 200° C.;
- pot-life modulatable in function of the various applications, and suh to allow an easy processing of the crosslinkable compositions;
- high chemical resistance, antigraffiti properties and low friction coefficient of the obtained coatings.

The Applicant has surprisingly and unexpectedly found polyurethane compositions which show the above property combination.

An object of the present invention is a composition comprising anionic ionomeric polyurethanes crosslinkable in a wide temperature range, in particular from +10° C. up to +200° C., said composition comprising the following components:

I) an aqueous dispersion of a crosslinkable linear ionomeric polyurethane, containing carboxylic groups and having perfluoropolyether structure;
II) a crosslinking agent;

the ratio between the equivalents of the functional groups of the crosslinking agent and of the carboxylic groups of component I) being at least 0.7 up to 1.5, preferably 0.9–1.2, said crosslinking agent being dispersible and/or soluble in the dispersion component I).

The aqueous dispersion component I) has preferably a dry residue from 20% to 40% by weight.

The dispersion component I) (per)fluoropolyether ionomeric polyurethanes are obtainable by reaction of the following monomers and macromers:

a) (per)fluoropolyether diols having a number average molecular weight from 400 to 5,000, preferably from 800 to 2,500;

b) diisocyanates selected from one or more of the following:

$$\text{OCN—R—NCO} \qquad (IA)$$

wherein R is a bivalent radical selected from the following:
- $C_2$–$C_{12}$ aliphatic;
- $C_6$–$C_{18}$ cycloaliphatic or alkylen-cycloaliphatic, wherein optionally the cycloaliphatic ring can be substituted with one or more $C_1$–$C_3$ alkyl groups, or R contains two cycloaliphatic rings, comprising each one of the NCO groups indicated in (IA), said rings joined each other by a $C_1$–$C_6$ alkylene chain;
- $C_6$–$C_{18}$ aromatic, wherein the aromatic ring can be substituted with one or more $C_1$–$C_3$ alkyl groups, or R contains two aromatic rings, comprising each one of the NCO groups indicated in (IA), said rings joined each other by a $C_1$–$C_6$ alkylene chain;

c) ionomeric diols, having a carboxylic function, of the following general formula:

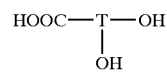

wherein:
T is a linear or branched $C_2$–$C_{20}$, preferably $C_2$–$C_{10}$, trivalent aliphatic radical;
the two hydroxyls can substitute also two differrent aliphatic chains, and are never on the same carbon atom;

optionally one or more of the following components:
d) hydrazine and/or $C_2$–$C_6$ aliphatic diamines;
e) linear or branched $C_2$–$C_6$ hydrogenated diols optionally containing one cycloaliphatic or aromatic ring having 6 carbon atoms and/or one or two oxygen atoms;

in said polyurethane the equivalents of the —NCO groups are equal to the sum of the equivalents of the alcoholic —OH groups, optionally summed to the —NH$_2$ groups when the component d) is present.

The amounts of the components in the polymer I), expressed in percentages by weight are the following:
- component a) 60%–85%;
- component b) 10%–35%;
- component c) 3%–10%;
- component d) and/or e) 0–10%, the total sum of the components being 100%; the carboxylic equivalent weight ranging from 2,000 to 6,000 g/eq.

The carboxylic equivalent weight is determined by the ratio between the sum of the weight corresponding to the components present in grams and the number of equivalents of the carboxylic groups present (component c)).

Said polyurethanes can be obtained according to different reaction schemes, provided that the final stoichiometry and the % limits by weight of each component, as above indicated, are respected.

The bifunctional (per)fluoropolyethers indicated in a) have one or more of the following units statistically distributed along the chain: $(CF_2CF(CF_3)O)$; $(CF(CF_3)CF_2O)$; (CFYO) wherein Y is F or $CF_3$; $(CF_2CF_2O)$; $(CF_2(CF_2)_{x'}CF_2O)$ wherein x' is an integer equal to 1 or 2; $(CR_4R_5CF_2CF_2O)$ wherein: $R_4$ and $R_5$ are equal or different the one from the other and selected between H, Cl, and one fluorine atom of the perfluoromethylene unit can optionally be substituted with H, Cl or (per)fluoroalkyl, having for example from 1 to 4 carbon atoms.

The preferred bifunctional compounds of a) are the following with the perfluorooxyalkylene units statistically distributed along the chain:

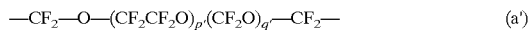
$$-CF_2-O-(CF_2CF_2O)_{p'}(CF_2O)_{q'}-CF_2- \quad (a')$$

wherein:

p' and q' are numbers such that the q'/p' ratio is comprised between 0.2 and 4, p' being different from zero; and the number average molecular weight is in the above range;

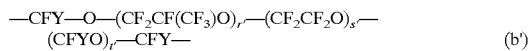
$$-CFY-O-(CF_2CF(CF_3)O)_{r'}-(CF_2CF_2O)_{s'}-(CFYO)_{t'}-CFY- \quad (b')$$

wherein:

Y is as above; r', s' and t' are numbers such that r'+s' is in the range 1–50, the t'/(r'+s') ratio is comprised between 0.01 and 0.05, r'+s' being different from zero, and the molecular weight is in the above range;

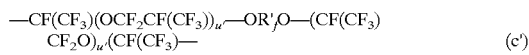
$$-CF(CF_3)(OCF_2CF(CF_3))_{u'}-OR'_fO-(CF(CF_3)CF_2O)_{u'}(CF(CF_3)- \quad (c')$$

wherein:

$R'_f$ is a $C_1-C_3$ perfluoroalkyl bifunctional radical; u' is a number such that the number average molecular weight is in the above range;

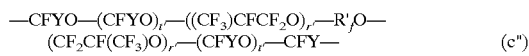
$$-CFYO-(CFYO)_{t'}-((CF_3)CFCF_2O)_{r'}-R'_fO-(CF_2CF(CF_3)O)_{r'}-(CFYO)_{t'}-CFY- \quad (c'')$$

wherein:

$R'_f$ is a $C_1-C_3$ perfluoroalkyl bifunctional radical; r', t' and Y are as above; r' and t' such that the number average molecular weight is in the above range;

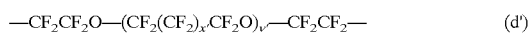
$$-CF_2CF_2O-(CF_2(CF_2)_{x'}CF_2O)_{v'}-CF_2CF_2- \quad (d')$$

wherein:

v' is a number such that the molecular weight is in the above range; x' is an integer equal to 1 or 2;

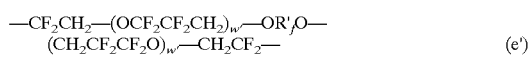
$$-CF_2CH_2-(OCF_2CF_2CH_2)_{w'}-OR'_fO-(CH_2CF_2CF_2O)_{w'}-CH_2CF_2- \quad (e')$$

wherein:

$R'_f$ is as above; w' is a number such that the number average molecular weight is in the above range;

the end groups of the bifunctional perfluoropolyethers componenet a) being of the $-CH_2-(OCH_2CH_2)_{k'}-OH$ type, wherein k' is a number comprised between 0 and 2.

The bifunctional (per)fluoropolyoxyalkylenes can be prepared starting from the corresponding (per)fluoropolyoxyalkylenes having —COF end groups (see for example patents GB 1,104,482, U.S. Pat. No. 3,715,378, U.S. Pat. No. 3,242,218, U.S. Pat. No. 4,647,413, EP 148,482, U.S. Pat. No. 4,523,039, EP 340,740, patent application WO 90/03, 357, U.S. Pat. No. 3,810,874, EP 239,123, U.S. Pat. No. 5,149,842, U.S. Pat. No. 5,258,110).

Preferably the diisocyanates b) are selected from the following: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or its isomers, xylylene diisocyanate, naphthalene-1, 5-diisocyanate, p-phenylen-diisocyanate.

Preferably c) is the 2,2-dimethylolpropionic acid having the following formula:

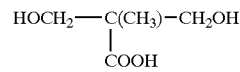
$$HOCH_2-\underset{COOH}{C(CH_3)}-CH_2OH$$

Preferably the optional compounds d) are ethylendiamine, hexamethylendiamine; the optional compounds e) are 1,4-butandiol, 1,4-cyclohexylendimethylol, hydroquinone bis (2-hydroxyethylether).

Preferably the compositions according to the present invention do not contain surfactants.

The process for the preparation of the polyurethanes used in the present invention, and of the dispersions containing them, can for example be carried out according to the following steps:

1. Prepolymerization between the PFPE diol a) and the diisocyanate b) in a reactor, at the temperature of 50°–90° C., under mechanical stirring, preferably in dipolar aprotic solvents such as MEK (methylethylketone) or NMP (N-methylpyrrolidone) at 90–70% of dry product, in anhydrous and inert nitrogen atmosphere and in the presence of a catalyst such for example tertiary amines (e.g. triethylamine) or Sn salts, in amounts from 0.005 to 0.03% by weight with respect to the diisocyanate. The reaction continues at the indicated temperatures until reaching the theoretic —NCO titre on the basis of the used stoichiometry. The —NCO content is determined by titration, as described later on.

2. Chain extension of the obtained prepolymer at the end of 1. by reaction with the ionomeric diol c), optionally salified with a tertiary amine, optionally in admixture with the diol component e) to have a dry product from 60% to 75% by weight, working at the temperature of 60° C.–70° C., under strong stirring, for a time from 4 h to 10 h, until in the reaction mixture IR spectrum the characteristic —NCO band (2260 cm$^{-1}$) disappears.

3. Polyurethane salification with tertiary amines if not carried out in 2., discharge of the product under mechanical stirring in a diluting apparatus containing H$_2$O obtaining a polymer dispersion in H$_2$O, and optionally subsequent distillation of the volatile solvent at 40°–60° C. under reduced pressure, lower than 100 mbar (10$^4$ Pa)

Alternatively, the prepolymer obtained in 1. in step 2. can only partially be chain extended with the ionomeric diol c) or with a mixture of the diol c) with the optional component e), obtaining a prepolymer of ionomeric type wherein there are still unreacted —NCO functions. Said ionomeric prepolymer can be discharged in H$_2$O as described in step 3. The polymerization is ended by subsequent addition in H$_2$O of component d) until the disappearance of the —NCO band at 2260 cm$^{-1}$ in the IR spectrum.

In all cases the final product appears as an aqueous dispersion characterized by a dry residue amount preferably from 20 to 40%, organic solvents in an amount lower than or equal to 7% by weight, preferably lower than or equal to 2% by weight, still more preferably lower than 0.5% by weight based on the dispersion, viscosity<500 mPa.s and pH comprised between 6 and 9 in function of the amount of ionomeric chain extender c) and of the basic equivalents used in the neutralization.

The dispersion component I) of the present invention, as said, contains ionomeric polymers, having an urethane and/or ureic character, with a perfluoropolyether structure, wherein the ionic function is the carboxylic function.

The crosslinking agent component II) is a compound dispersible or soluble in the dispersion component I), and has functionality$\geq 2$; the crosslinking agent functional groups react with the carboxylic groups forming interchain chemical bonds.

Examples of crosslinking agents usable in the compositions according to the present invention are polyfunctional aziridines such for example CX® 100 (Zeneca), methoxymethylolated melamines such for example Cymel® 303 (Cytec), intermediates for ureic resins, carbodiimides for example Ucarlink® X29 (Union Carbide), hydrodispersible or water-soluble blocked isocyanates under the use conditions, hydrodispersible epoxy-alkoxysilanes such for example Coatosil® 11988 (Witco), hydrodispersible zirconium salt for example Bakote® 20 (Mel Chemicals).

The coating formation and the crosslinking reaction take place in a wide temperature range, from $+10°$ C. to $+200°$ C.

The crosslinking agent to be used is selected in function of the application temperature. For example for applications at room temperature polyaziridne can be used, while for applications at high temperature methoxymethylolated melamines can be used.

This crosslinking type is defined in the prior art "external crosslinking" since component II) is not part of the polyurethane molecule.

The two composition components according to the present invention can be mixed, obtaining stable compositions, characterized by a high pot-life which allows all the necessary operations to complete the process.

The present invention composition applications on substrata can be carried out by conventional techniques: by spraying, by dipping, by filmspreading bar, by brush, etc.

The obtained crosslinked coatings have the very good combination of the aforesaid properties, in particular they are water resistant, solvent resistant, stain resistant (antigraffiti), and show low friction coefficient.

The substrata to which the present invention compositions are applied are the most various substrata.

For example they can be metal parts, plastic or natural or synthetic rubber section bars, facilities, building faces; more generally all that must be protected from dirt, from the deterioration due to atmospheric agents, from aggressive agents, and from graffiti made for example with inks, spray paints, colored chalks.

The application substrata can be surfaces of materials of which it is necessary to reduce the friction characteristics. The achieved protection is lasting and resistant to several washings even to those of a slightly abrasive type.

Said properties are particularly important when the crosslinked film is applied on surfaces of flexible substrata and having a low hardness, such for example rubber surfaces (example brushes for car windscreen wipers).

Furthermore the present invention crosslinkable coatings can be applied on skin and leather as finishings to obtain hydro- and oil-repellence, applications requiring temperatures lower than $50°$ C.

In the case of rubber surfaces it is not necessary to carry out the pretreatments of the prior art (crown treatment, etc.).

The polyurethane dispersions of the present invention can easily be formulated with conventional organic or inorganic additives, as for example opacifying agents and pigments known in the prior art (silicas, metal oxides such as titanium dioxide), or solid lubricants (ex. PTFE, even under the form of nanoparticles having sizes from 5 to 100 nm, preferably 20–60; graphite, molybdenum bisulphide) obtaining a variety of finishings having a low friction coefficient and modulatable gloss. The gloss can for example range from zero to about 80. Said finishings can be glossy, opaque, colourless or coloured, both transparent and covering depending on the application requirements.

The present invention compositions confer to substrata on which they are applied hydro- and oil-repellence, low friction coefficient, cleanability from the graffiti and from the dirting agents without leaving halos.

The present invention polyurethane compositions are applicable on surfaces of various substrata, as stones, metals, plastic materials, rubbers, leather and skin. In any case the filming capability and the adhesion to the substratum are very good.

The coatings obtained with the present invention aqueous compositions have high performances for antigraffiti applications, equal to those obtainable using with solvent crosslinkable polyurethanes of the prior art, for example those described in U.S. Pat. No. 6,071,564. It is surprising that starting from a heterogenous system as an aqueous dispersion of a polyurethane, a film can be obtained by deposition on a substratum showing the same antigraffiti properties as that obtained from homogeneous polyurethane solutions in organic solvents. However the present invention polyurethane compositions with respect to those of the above patent allow to obtain a lower friction coefficient.

The Applicant surprisingly and unexpectedly has found that the present invention compositions allow to obtain homogeneous surfaces and with the combination of the indicated properties even using aqueous dispersions, constituted by distinct particles formed by aggregates of macromolecules which must coalesce to give a continuous coating. Said coatings show a continuity comparable with that obtained starting from polyurethane solutions in organic solvents. In the latter case the film is obtained by deposit of single macromolecules, the aggregates being absent. The fact to obtain continuous films starting from the invention aqueous dispersions is still more surprising if one considers that in the invention compositions preferably surfactants are not present, known as filming coadjuvants. It is well known that the surfactant use has the drawback to remain in the film and cause a lower resistance to water. On the contrary, the invention polyurethane lyophilic groups do not cause any undesired effect as the surfactants.

Besides, the Applicant has unexpectedly and surprisingly found that the coatings obtainable with the invention compositions confer to the substrata, such for example metals or rubbers, a friction coefficient reduction comparable with that of the coatings of cation perfluoropolyether polyurethanes, described in EP 1,162,220. However also the present invention compositions show an improved chemical resistance.

The Applicant has furthermore shown that by applying to substrata only the dispersion component I), coatings with unacceptable chemical resistance and hardness properties and besides having a lower hydrophobicity, are obtained (see the comparative Examples).

The invention polyurethane compositions are substantially aqueous. Indeed they contain at most 7% by weight, preferably no more than 2% by weight, still more preferably<0.5% by weight of organic solvents deriving from the polyurethane synthesis. The compositions however result non flammable and have a flash point, on an average, higher than $75°$ C. See the Examples. Therefore the invention compositions are particularly usable for applications wherein the use of compositions containing solvent is banned by the actual regulations, for example the treatment of walls of closed environments or of places frequented by public, as underground stations (underground), etc.

Furthermore the invention compositions can also be applied to substrata, such for example plastic materials, as polycarbonate, polymethylmethacrylate, which as well known cannot be treated with products containing solvents since they produce crazing.

It has been found that the invention compositions can be used for the treatment of skins and leather, and allow to obtain properties substantially similar to those of the compositions containing solvents but with the above advantages.

The following Examples illustrate the invention without limiting the scope thereof.

EXAMPLES

Characterization Methods

Determunation Method of the Dynamic Friction Coefficient

The dynamic friction coefficient (COF) is determined vs glass, using a slide having weight of 4.75 g and area of 3.9 $cm^2$, which is slid on the tested specimen at the rate of 156 mm/min. The quotient between the average value of the force exerted on the slide, detected by a dynamometer and the specimen weight gives the dynamic COF value.

Evaluation of the Antigraffiti Properties

Some coloured signs are traced along the specimen width with indelible marking pens (Pentel NN50 type) of different colour (red, blue, black). The dirtied specimens are conditioned in a stove for at least 30 min at 50° C.–60° C. A cotton flock soaked in denatured alcohol is passed on the surface and it is evaluated, by comparison with a specimen, not dirtied, if the surface has become perfectly clean or if stains or halos remain.

Determination Method of the Resistance to Synthetic Sweat

An aqueous solution having the following composition determined as percent by weight: 5% of lactic acid, 10% of NaCl, is prepared. A cotton-wool flock is soaked in the aqueous solution and put into contact with the polymeric coating applied on aluminum. The system is then hermetically sealed and put in a stove at 50° C. for 16 hours. After cotton removal it is visually evaluated the specimen surface appearance and if the polymeric film has remained integral or shows swellings.

Viscosity Determination

The viscosity of the aqueous dispersions and resins has been determined at the indicated temperature with a Brookfield mod. DV-II viscometer.

Dry Residue Determination

The determination has been carried out by weighing the residue obtained starting from an exactly weighed dispersion amount (about 0.5–1 g), put in an open aluminum vessel and kept in a stove for 15 minutes at 150° C.

Coating Hardness Determination

The hardness has been determined as resistance to the incision of a series of Koh-I-Noor pencils having a rising hardness according to ASTM D 3363.

Adhesion Determination

The adhesion to the substratum of polymeric films has been evaluated by dividing into squares by incision and tear standard adhesive tape according to the cross cut test described in ASTM D 3359.

Chemical Resistance Determination

The film chemical resistance has been evaluated in 2 ways:
by rubbing a cotton flock soaked in MEK or Ethanol at the frequency of 1 cycle/second and exerting a force of about 1 kg weight. It is determined how many strokes or cycles are necessary to remove the film according to AICC 23;
by evaluating visually the film damaging after deposition of a drop of solvent or aqueous solution, acid or basic, according to the ASTM D 1308 spot test.

Determination of the Brightness or Gloss

The film gloss has ben measuted by a Braive reflectometer at 60° according to ASTM D 523.

Determination of the Tack-ree Time

The Tack-free time is the time interval, expressed in minutes, employed by the coating to lose adhesivity to the touch.

Determination of the Gel Amount in the Coating

The gel amount is determined as difference by extraction of the uncrosslinked product. A coating specimen, of about 1.5 g and thickness of 1.5 mm, after the crosslinking cycle is continuously extracted with THF (in Sohxlet apparatus) for 40 h. After drying under vacuum at 50° C., the residue is weighed and by difference the gel percentage is obtained.

Antispot Test on Treated and Untrited Skin with the Present Invention Dispersions The test is carried out by depositing on the skin specimens, respectively, drops of distilled water and seed oil.

After 4 hours the drops are removed with a cloth and it is observed if the treated and untrited specimens have maintained the appearance preceding the test, or if spots or halos have remained.

Example 1

Synthesis of an Anionic Polyurethane Obtained by Starting from a (Per)Fluoropolyether Diol Having Number Average Molecular Weight 1,500 and Characterization of the Corresponding Aqueous Dispersion 850 g of isophorondiisocyanate (IPDI), 937 g of methylethylketone (MEK), 2,900 g of (per)fluoropolyether diol (ZDOL), having number average molecular weight Mn 1,500 and the following structure:

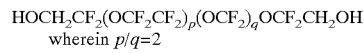

wherein $p/q=2$ are transferred into a 10 litre reactor, equipped with mechanical stirrer, reflux condenser, thermometer and charging hopper.

The mixture is heated to 50° C. under stirring, then 0.420 g of dibutyltin dilaurate (DBTDL) are added and it is heated at 65° C. for 120 minutes. At the end on a reaction mixture sample the residual —NCO groups are titrated, which result 3.4% based on the dry product.

251 g of MEK are added and under strong stirring, 270 g of dimethylolpropionic acid (DMPA), which is solubilized in the reaction mixture by dripping 200 g of triethylamine (TEA). Heating at 65° C. is continued for 6 hours. Lastly the reaction completion is controlled by IR spectroscopy (disappearnace of the —NCO band at 2260 $cm^{-1}$).

The polymer solution is then cooled to 40° C. and diluted with 825 g of isopropanol (IPA), and dripped in one hour in a second 30 litre reactor equipped with Rashton type stirrer at 200 rpm and containing 12 litres of $H_2O$.

After volatile solvent distillation at the temperature of 50° C., using a vacuum of 80–100 mbar ($8,10^3$ Pa–$1,10^4$ Pa), about 16 Kg of dispersion are obtained, appearing slightly opalescent and having the following characteristics:

Dry residue=25.5%;

Viscosity at 20° C.=100 mPa.s;

pH=7.8.

Example 1b (Comparative)

Characterization of the Film Obtained from the Dispersion Prepared According to Example 1

The dispersion of Example 1 is applied by using a film-spreader on various chromium plated aluminum panels (Q-Panel), and on glass panels.

Tack free time: 32 min at 18° C. and 62% relative humidity.

The characterization data are reported in Table 1.

Example 2

Synthesis of an Anionic Polyurethane-urea from ZDOL 1500 and Characterization of the Corresponding Aqueous Dispersion 110.3 g of IPDI, 230 g of perfluoropolyether diol of Example 1, 14.1 g of dimethylolpropionic acid and 10.6 g of triethylamine are introduced under nitrogen in a 500 ml flask. The reaction is carried out at 50° C. for 45 minutes, then the —NCO titre is controlled.

The —NCO ended prepolymer is diluted with N-methyl pyrrolidone (NMP) until having a dry product of 85% and it is poured in 30 minutes in a second reactor equipped with a Rashton type stirrer and containing 790 g of water maintained at the temperature of 5° C. Once the prepolymer addition is over, 10 g of ethylendiamine are slowly added until disapperance of the —NCO group signals (IR spectroscopy).

A polyurethane/ureic dispersion is obtained, appearing slightly opalescent, having the following characteristics:

Dry product: 29.5%;

Viscosity at 20° C.: 20 mPa.s;

pH: 7.8.

Example 3 (Comparative)

Synthesis of a Self-Crosslinking Cationic Polyurethane According to EP 1,162,220

400 g of Vestanat® T1890 (cyclic trimer of the isophorondiisocyanate) dissolved in 400 g of anhydrous ethyl acetate are fed in a 2 litre glass reactor equipped with mechanical stirring, thermometer, reflux condenser and maintained under nitrogen. The solution is heated up to 70° C., then 2.5 ml of a solution at 20% w/w of Fascat® 4224 (tin-based catalyst-Ato-chem) are added and 55.07 g of dimethylaminopropanol are dripped in one hour. It is let react for another hour and the —NCO titre is measured.

A solution formed by 1,171 g of perfluoropolyether diol, having chemical formula as reported in Example 1, but having molecular weight 1,400, diluted with 297 g of anhydrous ethyl acetate, is fed to a 6 l second reactor at the temperature of 70° C. The polyisocyanate of the first reactor is dripped in one hour under stirring in the second reactor. It is let stir for a further hour until disappearance of the —NCO group band (IR spectroscopy).

Acetic acid (38.5 g) dissolved in NMP (162 g) is added, it is let stir for 30 minutes, then 3.8 kg of distilled water are added in one hour under strong stirring (500 rpm), until obtaining a cationic polymeric dispersion in water. The organic solvent is finally removed by evaporation (40° C., 50 mmHg), until obtaining a polymeric dispersion in water at 30% w/w.

Example 4 (Comparative)

Synthesis of a Based on Solvent, Non Ionomeric Polyurethane According to U.S. Pat. No. 6,071,564 from IPDI Trimer Crosslinkable with Humidity 345 g of Vestanat® T1890 and 400 g of butyl acetate are introduced in a 2 l glass reactor equipped with mechanical stirring, thermometer, reflux. After isocyanate dissolution, the temperature is brought up to +70° C. and then 248 g of perfluoropolyether diol having chemical formula as in Example 1, but with molecular weight 1,100, and 7 mg of catalyst DASCO® 131 (tin salt—Air Products) are added. The reaction continues at the temperature of 70°–80° C. for 6 hours, then the reaction completion is controlled by —NCO groups titration.

Dry product: 60%;

Viscosity at 20° C.: 350 mPa.s;

Equivalent weight —NCO: 1,200.

Example 5 (Comparative)

Synthesis of a Based on Solvent, Non Ionomeric Polyurethane According to U.S. Pat. No. 6,071,564 from IPDI Trimer Crosslinkable with Humidity With analogous modalities of Example 4 (comparative), 352 g of Tolonate® HDT (HDI Trimer–Rhodia), 400 g of butyl acetate and 248 g of pefluoropolyether diol having molecular weight 1,100 are introduced in the reactor, it is brought to 90° C. and 7 mg of DABCO® 131 catalyst are added. It is maintained in temperature for 2 hours, then the reaction completion is controlled by —NCO titration.

Dry product: 60%;

Viscosity: 180 mPa.s;

Equivalent weight —NCO: 790.

Example 6

Crosslinking of the Ionomeric Polyurethane of Example 1 with Polyaziridine 0.8 g of polyaziridine CX 100 (Zeneca) prediluted in water in a 1:3 ratio by weight, were added to 40 g of the dispersion (dry product 25.5%) of Example 1. The mixture is maintained at room temperature under stirring for 15 min.

The dispersion containing aziridine is applied using a film spreader on various chromium plated aluminum panels (Q-Panel), and on aluminum panels white painted with epoxy primer, and on glass panels.

The obtained coatings have been characterized after one week of crosslinking at room temperature.

Example 7

Characterization of the Films Obtained in Example 6

Tack free time: 30 min at 18° C. and 62% relative humidity.

Spot test:

| | |
|---|---|
| HCl 10% w/v | unaltered appearance; |
| H₂SO₄ 10% w/v | presence of a light halo; |
| NaOH 10% w/v | presence of a light halo; |
| Toluene | unaltered appearance; |
| Acetone | unaltered appearance; |
| MEK | unaltered appearance. |

The other characterization data are reported in Table 1.

Example 8

Crosslinking of the Ionomeric Polyurethane of Example 1 with Epoxysilane 3.5 g of the epoxysilane crosslinking agent Y 11988 and 0.7 ml of a catalyst solution (Imicure® EMI—24—Air Products) at 5% weight/volume in water were added to 40 g of dispersion (dry product 25.5%) of Example 1. The mixture is maintained at room temperature under stirring for 15 min.

The dispersion containing the crosslinking agent is deposited by a film spreader on chromium plated aluminum panels and on aluminum panels white painted with epoxy primer, and on glass panels.

The obtained coatings have been subjected to the following crosslinking cycle: 30 min at 50° C.+5 days at room temperature.

Example 9

Characterization of the Film of Example 8

Tack free time: 112 min at 22° C. and 52% relative humidity.

The characterization data are reported in Table 1.

Example 10

Crosslinking of the Ionomeric Polyurethane of Example 1 with Hexamethoxymethyl-melamine 0.48 g of Cymel® 303 dissolved in isopropanol in weight ratio 1:1 are added to 40 g of dispersion (dry product 25.-5%) of Example 1. The mixture is maintained at room temperature under stirring for 15 min.

The dispersion containing the crosslinking agent is deposited by a film spreader on a chromium plated aluminum panels and on aluminum panels white painted with epoxy primer, and on glass panels.

The obtained coatings have been subjected to the following crosslinking cycle: 5 min at 180° C.

Example 11

Characterization of the Crosslinked Film Obtained in Example 10.

The characterization data are reported in Table 1.

Comment on the Data of Table 1

The Table shows that in absence of crosslinking the chemical resistance and the hardness have very low values.

Example 12

Opacified Composition Preparation Starting from the Composition of Example 10 (Polyurethane+Melamine)

2.6 g of latex from PTFE microemulsion are added to 80 g of composition of Example 10 (polyurethane+melamine), obtaining a limpid dispersion: to this 20 g of an opacifying paste, prepared as follows, are mixed.

In a 500 ml plastic cylindrical vessel the following components are mixed, in the indicated order, under soft stirrinq: Addid® 820 (antifoam, Wacker Chemie) 5 g, ethylen glycol butylether 20 g, 1-methoxy-2-propanol 20 g, and 5 g of OK500® (opacifying silica, Degussa). After having soaked the silica with the solvents, 48.6 g of water and 1.6 g of Aerosil® 202 are added (silica to confer thixotropic characteristics, Degussa), obtaining a turbid, not very viscous and homogeneous paste. In this way 100 g of paste are prepared.

Example 13

Application of the Opacified Composition Prepared in Example 12 to Rubber Specimens The opaque dispersion of Example 12 has been applied by one spray coat (gun for aerograph, nozzle 4) on rubber specimens (EPDM, NR natural rubber), previously cleaned with isopropanol, without pretreatment and without primer application. The NR specimens have been conditioned in a stove at 135° C. for 15 minutes, while the EPDM specimens at 150° C. for 5 minutes.

The dynamic friction coefficient (COF) has been determined vs glass according to the described method. The results are reported in Table 2.

Comment to the Data of Table 2

The Table shows that with the compositions of the present invention protective coatings are obtained on rubber, characterized, with respect to the untreated rubber, by reduced friction coefficient. The coatings show very good adhesion, chemical resistance and gloss reduction. Said properties are reached by treating with the invention compositions the rubber as such, without pretreatments with commercial primers or oxidative systems such as the plasma, crown or UV irradiation treatment, as disclosed in the prior art for these applications.

Example 14 (Comparative)

Application of Self-crosslinking Cationic Oligourethane on EPDM Rubber

The dispersion obtained in Example 3 (comparative) is applied by one spray coat (gun for aerograph, nozzle 4) on EPDM rubber specimens. The crosslinking is carried out at 180° C. for 5 minutes.

Friction coefficient=0.20±0.05;

Chemical resistance (ethanol)=2/5 double strokes.

The obtained data show that with the self-crosslinking polyurethanes of the prior art it is not possible to obtain coatings on rubber with the good combination of properties obtained with the compositions of the present invention. Furthermore the crosslinking conditions required for the self-crosslinking oligourethanes (180° C.) exclude their use for applications on natural rubber.

Example 15

Preparation of a Water Composition for Antigraffiti Coating for Application on Asbestos Cement Tiles 20 g of an opacifying paste, prepared as follows, are mixed to 80 g of the composition of Example 6 (anionic polyurethane+polyaziridine).

In a 500 ml plastic cylindrical vessel the following components are mixed, in the indicated order, under soft stirring: Addid® 820 (antifoam, Wacker Chemie) 5 g, ethylen glycol butylether 20 g, 1-methoxy-2-propanol 20 g, and 15 g of OK500 (opacifying silica, Degussa) and 1.6 g of Aerosil 202. After having soaked the silica with the solvents, 38.4 g of water are added and the whole is mixed with a Maver disperser having inclined blades at 2,500 rpm for 30 minutes, obtaining a turbid viscous and homogeneous paste.

The opaque dispersion obtained with the composition of Example 6 has been applied by 3 spray coats (gun for aerograph, nozzle 4) on asbestos cement tiles (Cembonit), conditioned in a stove at 50° C. for 6 hours.

The antigraffiti test has been carried out according to the above reported method.

The results are reported in Table 3. The comments on the Table are reported at the bottom of the Example 16 (comparative).

Example 16 (Comparative)

Antigraffiti Coating, Based on Solvent, Prepared by Using Non Ionomeric Polyurethanes of U.S. Pat. No. 6,071,564

A composition based on solvebt has been prepared, formed by a hygrohardening oligourethane mixture having a perfluoropolyether chain as described in Examples 4 (comparative) and 5 (comparative), in a weight ratio 1:3. Opacifying silica (3% of TS 100, Degussa), previously dried in muffle has been added to the so obtained composition under mechanical stirring.

Then the composition for the spray application has been diluted at 50% of dry product with butyl acetate, and dibutyl tin dilaurate (0.5% by weight on the dry product) has been added as catalyst. The composition has been lastly spray applied (SATA Jet gun, nozzle 1.2, pressure 3 bar or 0.3 MPa) on asbestos cement tiles and crosslinked at room temperature for 7 days. The results are reported in Table 3.

Comment on the Data of Table 3

The Table shows that the film obtained with the crosslinkable composition based on solvent of the prior art has almost the same antigraffiti properties of the film obtained with the aqueous crosslinkable composition of the present invention, characterized by the absence of organic solvents (VOC). This repreents a further advantage since it allows a greater use flexibility for the invention compositions, which for example can be applied also in closed environments.

Example 17

Resistance Test to Synthetic Sweat of the Crosslinked Films Obtained in Example 10

The test is carried out as indicated in the "characterization" part. The results are reported in Table 4.

Example 18 (Comparative)

Resistance Test to the Synthetic Sweat of the Crosslinked Films Obtained in Example 16.

The test is carried out as indicated in the "characterization" part. The results are reported in Table 4.

Comments on the Data of Table 4

The Table shows that the films according to the invention, obtained by application of aqueous dispersions of anionic polyurethanes, have the same characteristics of resistance to synthetic sweat of the films obtained by application of solutions in organic solvents of non ionomeric polyurethanes.

Example 19

Application on Skins of the Crosslinkable Dispersion of Example 6

Two dilutions in water of the composition of Example 6 are prepared, respectively at 5% and at 10% by weight of dry product. The dispersion at 5% concentration of dry product is applied on nubuk skin and that at 10% concentration of dry product on grey calfskin.

The application is carried out by one spray coat (pressure 2–2.5 atm ($2.10^5$–$2.5.10^5$ Pa), nozzle 1.2 mm, two cross-coats).

The specimens are dried at 50° C. for 30 minutes and conditioned at a temperature comprised between 18° C. and 26° C. for 24 hours.

Example 20

Antispot Test on the Treated Skin Specimens of Example 19

On the specimens prepared as previously described the antispot test is carried out as above mentioned in the general part.

The results are reported in Table 5.

The Table shows that the treatment with the dispersions according to the present invention confers to the skin specimens good hydro- and oil-repellence properties.

TABLE 1

Properties of the coatings obtained in Examples 1B comp. (non-crosslinked composition Ex. 1), 7 (form. Ex. 6), 9 (form. Ex. 8) and 11 (form. Ex. 10)

|  | 1B comp | 7 | 9 | 11 |
|---|---|---|---|---|
| Tack free time | 32' at 18° C. | 30' at 18° C. | 112' at 22° C. | n.d. |
| Thickness ($\mu$m) | 5–7 | 10–20 | 20–40 | 5–10 |
| Adhesion on Al (%) | n.d. | 100 | 100 | 100 |
| Adhesion on glass (%) | n.d. | 90 | 100 | 100 |
| Chemical resistance (MEK double strokes) | 2 | >100 | >100 | >150 |
| % Gel | 0 | 97.8 | n.d. | n.d. |
| Gloss | 66.7 | 74 | 71 | 75 |
| Hardness | 4B | B–HB | F | F |

TABLE 2

Opacified composition of Example 13 applied on EPDM and NR (natural rubber), respectively

| Rubber | Thickness μm | Gloss | COF | Adhesion % | Resist. EtOH |
|---|---|---|---|---|---|
| EPDM | — | 31 | 1.2 ± 0.5 | — | — |
| treated EPDM | 4–6 | 4.3 | 0.24 ± 0.04 | 100 | — |
| NR | — | 66 | 0.7 ± 0.2 | — | — |
| treated NR | 7–8 | 4.7 | 0.24 ± 0.04 | 100 | — |

TABLE 3

Antigraffiti coatings: results obtained by applying on asbestos cement tiles the compositions respectively according to Examples 15 and 16 comparative (non ionomeric polyurethanes based on solvent according to U.S. Pat. No. 6,071,564)

| Asbestos cement | Thickness μm | Gloss | Antigraffiti properties |
|---|---|---|---|
| untreated | — | 10 | persistent spot |
| treated as from Ex. 15 | 30 | 12 | no spot or halo |
| treated as from Ex. 16 comp. | 30 | 12 | light halo |

TABLE 4

Resistance test to the synthetic sweat of the coatings prepared in Examples 10, 16 comp.

| coatings Ex. | test results |
|---|---|
| 10 | integral film; no spot or halo |
| 16 comp. | integral film; no spot or halo |

TABLE 5

Ex. 21: antispot test on specimens of different skin treated with the crosslinkable dispersion of Ex. 6. The Table reports the type of treated skin, the conc. by weight of the dry product in the used dispersions and the results of the antispot test

| Type of skin | Conc. % by wt. | Antispot Test water | seed oil |
|---|---|---|---|
| nubuk skin | — | spot | spot |
| " | 5 | absence of spots or halos | absence of spots or halos |
| grey calfskin | — | spot | spot |
| " | 10 | absence of spots or halos | absence of spots or halos |

The invention claimed is:

1. Compositions comprising anionic ionomeric polyurethanes crosslinkable in a wide temperature range from 10° C. up to 200° C., said compositions comprising the following components:
   I) an aqueous dispersion of a linear crosslinkable ionomeric polyurethane, containing carboxylic groups and having perfluoropolyether structure;
   II) a crosslinking agent;
   the ratio between the equivalents of the functional groups of the crosslinking agent and of the carboxylic groups of component I) being at least 0.7 up to 1.5 said crosslinking agent being dispersible and/or soluble in the dispersion component I).

2. Compositions according to claim 1, wherein the aqueous dispersion component I) has a dry residue from 20% to 40% by weight.

3. Compositions according to claim 1, wherein the (per)fluoropolyether ionomeric polyurethanes of the dispersion component I) are obtained by reaction of the following monomers and macromers:
   a) (per)fluoropolyether diols having a number average molecular weight from 400 to 5,000;
   b) diisocyanates selected from one or more of the following:

$$OCN-R-NCO \qquad (IA)$$

wherein R has the following meanings:
   $C_2-C_{12}$ aliphatic bifunctional radical;
   $C_6-C_{18}$ cycloaliphatic or alkylen-cycloaliphatic, wherein optionally the cycloaliphatic ring can be substituted with one or more $C_1-C_3$ alkyl groups, or
   R contains two cycloaliphatic rings, comprising each one NCO group joined by a $C_1-C_6$ alkylene chain;
   $C_6-C_{18}$ aromatic bifunctional radical, wherein the aromatic ring can be substituted with one or more $C_1-C_3$ alkyl groups, or
   R contains two aromatic rings, each comprising one NCO group, joined by a $C_1-C_6$ alkylene chain;
   c) ionomeric diols, having a carboxylic function, of the following general formula:

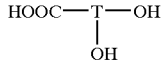

wherein:
   T is a linear or branched $C_2-C_{20}$ trivalent aliphatic radical;
   the two hydroxyls can substitute also two different aliphatic chains, and are never on the same carbon atom;
optionally one or more of the following components:
   d) hydrazine and/or $C_2-C_6$ aliphatic diamines;
   e) linear or branched $C_2-C_6$ hydrogenated diols optionally containing one cycloaliphatic or aromatic ring having 6 carbon atoms and/or one or two oxygen atoms;
   in said polyurethane the equivalents of the —NCO groups are equal to the sum of the equivalents of the alcoholic —OH groups, optionally summed to the —NH$_2$ groups when the component d) is present.

4. Compositions according to claim 3, wherein the amounts of the components in the polymer I), expressed in percentages by weight are the following:
   component a) 60%–85%;
   component b) 10%–35%;
   component c) 3%–10%;
   component d) and/or e) 0–10%,
   the total sum of the components being 100%; the carboxylic equivalent weight ranging from 2,000 to 6,000 g/eq.

5. Compositions according to claim 1, wherein the bifunctional (per)fluoropolyethers indicated in a) have one or more of the following units statistically distributed along the chain: $(CF_2CF(CF_3)O)$; $(CF(CF_3)CF_2O)$; (CFYO) wherein Y is F or $CF_3$; $(CF_2CF_2O)$; $(CF_2(CF_2)_xCF_2O)$ wherein x' is an integer equal to 1 or 2; $(CR_4R_5CF_2CF_2O)$ wherein: $R_4$ and $R_5$ are equal or different the one from the other and selected from H, Cl, and one fluorine atom of the perfluoromethylene unit can optionally be substituted with H, Cl or (per)fluoroalkyl.

6. Compositions according to claim 5, wherein the bifunctional compounds a) have a number average molecular weight from 400 to 5,000 and are selected from the following with the perfluorooxyalkylene units statistically distributed along the chain:

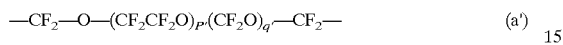
$$-CF_2-O-(CF_2CF_2O)_{p'}(CF_2O)_{q'}-CF_2- \quad (a')$$

wherein:
p' and q' are numbers such that the q'/p' ratio is comprised between 0.2 and 4, p' being different from zero; and the number average molecular weight is in the above range;

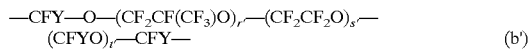
$$-CFY-O-(CF_2CF(CF_3)O)_{r'}-(CF_2CF_2O)_{s'}-(CFYO)_{t'}-CFY- \quad (b')$$

wherein:
Y is as above; r', s' and t' are numbers such that r'+s' is in the range 1–50, the t'/(r'+s') ratio is comprised between 0.01 and 0.05, r'+s' being different from zero, and the molecular weight is in the above range;

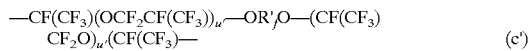
$$-CF(CF_3)(OCF_2CF(CF_3))_{u'}-OR'_fO-(CF(CF_3)CF_2O)_{u'}(CF(CF_3)- \quad (c')$$

wherein:
$R'_f$ is a $C_1$–$C_3$ perfluoroalkyl bifunctional radical; u' is a number such that the number average molecular weight is in the above range;

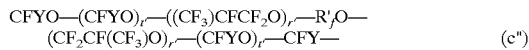
$$CFYO-(CFYO)_{t'}-((CF_3)CFCF_2O)_{r'}-R'_fO-(CF_2CF(CF_3)O)_{r'}-(CFYO)_{t'}-CFY- \quad (c'')$$

wherein:
$R'_f$ is a $C_1$–$C_3$ perfluoroalkyl bifunctional radical;
r', t' and Y are as above; r' and t' such that the number average molecular weight is in the above range;

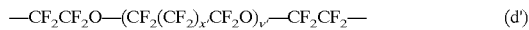
$$-CF_2CF_2O-(CF_2(CF_2)_xCF_2O)_{v'}-CF_2CF_2- \quad (d')$$

wherein:
v' is a number such that the molecular weight is in the above range;
x' is an integer equal to 1 or 2;

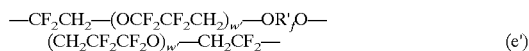
$$-CF_2CH_2-(OCF_2CF_2CH_2)_{w'}-OR'_fO-(CH_2CF_2CF_2O)_{w'}-CH_2CF_2- \quad (e')$$

wherein:
$R'_f$ is as above; w' is a number such that the number average molecular weight is in the above range;
the end groups of the bifunctional perfluoropolyethers component a) being of the $-CH_2-(OCH_2CH_2)_{k'}-$ OH type, wherein k' is a number comprised between 0 and 2.

7. Compositions according to claim 3, wherein the diisocyanates b) are selected from the following: hexamethylendiisocyanate (HDI), trimethylhexamethylenediisocyanate, isophorone diisocyanate (IPDI), 4,4'-methylenebis (cyclohexylisocyanate) (H12-MDI), cyclohexyl-1,4-diisocyanate, 4,4'-methylenebis (phenylisocyanate) (MDI) or its isomers, toluene 2,4-diisocyanate (TDI) or its isomers, xylylene diisocyanate, naphthalene-1,5-diisocyanate, p-phenylen-diisocyanate.

8. Compositions according to claim 3, wherein component c) is the 2,2-dimethyloipropionic acid having the following formula:

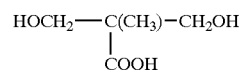
$$HOCH_2-\underset{\underset{COOH}{|}}{C(CH_3)}-CH_2OH$$

9. Compositions according to claim 3, wherein the optional compounds d) are selected from ethylendiamine, hexamethylendiamine; the optional compounds e) are selected from 1,4-butandiol, 1,4-cyclohexylendimethylol, hydroquinone bis(2-hydroxyethylether).

10. Compositions according to claim 1, containing organic solvents in an amount lower than or equal to 7% by weight.

11. Compositions according to claim 1, wherein the crosslinking agent component II) has functionality $\geq 2$ and is selected from polyfunctional aziridines, methoxy-methylolated melamines, intermediates for ureic resins, carbodiimides, hydrodispersible or water-soluble blocked isocyanates, hydrodispersible epoxy- alkoxysilanes, hydrodispersible zirconium salts.

12. Compositions according to claim 1, comprising organic or inorganic additives selected from opacifying agents and pigments, selected from silicas, metal oxides, in particular titanium dioxide, and solid lubricants.

13. Crosslinked compositions according to claim 1.

14. A method of preparing coatings on substrata by spraying, dipping, filmspreading bar, brush or other known conventional technique comprising utilizing the compositions of claim 1.

15. The method according to claim 14, wherein the compositions are applied to surface of plastic material or skins.

16. The method according to claim 14, wherein the compositions are applied on flexible substrata having a low hardness.

* * * * *